(12) United States Patent
Elg et al.

(10) Patent No.: US 9,570,106 B2
(45) Date of Patent: Feb. 14, 2017

(54) SENSOR CONFIGURATION SWITCHING FOR ADAPTATION OF VIDEO CAPTURING FRAME RATE

(71) Applicant: Sony Corporation, Tokyo (JP)

(72) Inventors: Johannes Elg, Lund (SE); Fredrik Mattisson, Lund (SE); Daniel Linåker, Lund (SE); Jonas Gustavsson, Lomma (SE); Ola Thörn, Limhamn (SE); Anders Wikander, Oxie (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 23 days.

(21) Appl. No.: 14/558,130

(22) Filed: Dec. 2, 2014

(65) Prior Publication Data

US 2016/0155472 A1   Jun. 2, 2016

(51) Int. Cl.
| | |
|---|---|
| *H04N 5/262* | (2006.01) |
| *G11B 27/00* | (2006.01) |
| *H04N 5/14* | (2006.01) |
| *H04N 7/01* | (2006.01) |
| *H04N 5/225* | (2006.01) |
| *H04N 5/232* | (2006.01) |
| *H04N 5/343* | (2011.01) |
| *H04N 5/345* | (2011.01) |

(52) U.S. Cl.
CPC ............ *G11B 27/005* (2013.01); *H04N 5/144* (2013.01); *H04N 5/2258* (2013.01); *H04N 5/23245* (2013.01); *H04N 5/343* (2013.01); *H04N 5/3454* (2013.01); *H04N 7/0127* (2013.01)

(58) Field of Classification Search
CPC ...................................................... H04N 5/262
See application file for complete search history.

(56) References Cited

U.S. PATENT DOCUMENTS

| | | | |
|---|---|---|---|
| 2004/0081437 A1* | 4/2004 | Asada | H04N 5/77 386/233 |
| 2004/0095492 A1 | 5/2004 | Baxter et al. | |
| 2007/0189386 A1 | 8/2007 | Imagawa et al. | |

(Continued)

FOREIGN PATENT DOCUMENTS

JP    2007096412 (A)    4/2007

OTHER PUBLICATIONS

International Search Report Corresponding to International Application No. PCT/EP2015/062416; Date of Mailing: Jul. 8, 2015; 10 Pages.

*Primary Examiner* — James Hannett
(74) *Attorney, Agent, or Firm* — Myers Bigel, P.A.

(57) ABSTRACT

On the basis of a first configuration of one or more imaging sensors, first video data is captured at a first frame rate and a first resolution and second video data is captured at a second frame rate and a second resolution. The second frame rate is higher than the first frame rate and the second resolution is lower than the first resolution. Further, an amount of motion is detected in the captured second video data. On the basis of the detected amount of motion, the at least one imaging sensor is switched to a second configuration. On the basis of the second configuration, third video data is captured at a third frame rate and a third resolution. The third frame rate is higher than the first frame rate and the third resolution is higher than the second resolution.

22 Claims, 4 Drawing Sheets

(56) References Cited

U.S. PATENT DOCUMENTS

| | | | |
|---|---|---|---|
| 2007/0268388 A1 | 11/2007 | Watanabe et al. | |
| 2010/0092151 A1* | 4/2010 | Miyakoshi | H04N 5/145 386/343 |
| 2010/0111489 A1* | 5/2010 | Presler | H04N 5/225 386/278 |
| 2010/0231738 A1* | 9/2010 | Border | H04N 5/2353 348/222.1 |
| 2013/0208143 A1* | 8/2013 | Chou | H04N 1/212 348/231.99 |
| 2013/0258167 A1* | 10/2013 | Gum | H04N 5/23212 348/349 |
| 2015/0154452 A1* | 6/2015 | Bentley | G06K 9/00711 386/201 |
| 2015/0229889 A1* | 8/2015 | Boettiger | H04N 9/09 348/262 |

* cited by examiner

SENSOR CONFIGURATION SWITCHING FOR ADAPTATION OF VIDEO CAPTURING FRAME RATE

FIELD OF THE INVENTION

The present invention relates to a method of capturing video and to a correspondingly configured device.

BACKGROUND OF THE INVENTION

Various kinds of electronic devices, e.g., smartphones, tablet computers, or digital cameras, also support capturing of video with a general trend to support of higher quality images by utilizing higher resolutions, such as "Full HD" (1920×1080 pixels) or "4 K" (3840×2160 pixels) and frame rates, e.g., 60 frames per second. Capturing video at high frame rates also allows for producing high quality slow motion videos.

However, the utilization of high frame rates and resolutions comes at the cost of increased resource usage, e.g., with respect to required memory for storage of the captured video data or energy consumption for operation of a high resolution image sensor at high frame rate. This may be taken into account by the user manually activating recording at higher frame rates only when needed, e.g., for generating a slow motion video of a scene with fast movements, such as a swimmer diving into the water.

However, such manual activation of high frame rate capturing implies the possibility that the user may forget to activate the high frame rate capturing or that the high frame rate capturing is activated too late, e.g., due to the fast movements in the scene not being expected by the user.

Accordingly, there is a need for techniques which allow for efficiently capturing video at higher frame rate.

SUMMARY OF THE INVENTION

According to an embodiment of the invention, a method of capturing video is provided. According to the method, at least one, imaging sensor is configured in a first configuration. On the basis of the first configuration, first video data is captured at a first frame rate and a first resolution and second video data is captured at a second frame rate and a second resolution. The second frame rate is higher than the first frame rate and the second resolution is lower than the first resolution. Further, an amount of motion is detected in the captured second video data. On the basis of the detected amount of motion, the at least one imaging sensor is switched to a second configuration. On the basis of the second configuration, third video data is captured at a third frame rate and a third resolution. The third frame rate is higher than the first frame rate and the third resolution is higher than the second resolution. The third resolution may be equal to the first resolution. However, the third video data may also be captured at other resolutions which are higher than the second resolution. The third frame rate may be equal to or higher than the second frame rate. The third frame rate may be at least 100 frames per second, whereas the first frame rate may be 20 to 60 frames per second, e.g., 24 frames per second, 25 frames per second, 30 frames per second, 50 frames per second, or 60 frames per second.

According to an embodiment, a slow motion video is generated at least on the basis of the third video data. In some embodiments, the slow motion video may be generated on the basis of the first video data, the second video data, and the third video data. For example, this may involve utilizing the first video data as a basis for calculating enhanced resolution video frames from the second video data and/or utilizing the second video data as a basis for calculating intermediate video frames for the first video data.

According to an embodiment, the amount of motion is detected on the basis of blur in the second video data. For example, if the amount of blur exceeds a threshold, the switching to the second configuration may be triggered. However, also other ways of detecting the amount of motion may be utilized as an alternative or in addition. For example, the amount of motion could be detected on the basis of motion vectors obtained by performing image analysis of a sequence of video frames of the second video data.

According to a further embodiment of the invention, a device is provided. The device comprises at least one image sensor and at least one processor. The at least one processor is configured to configure the at least one imaging sensor in a first configuration. Further, the at least one processor is configured to capture, on the basis of the first configuration, first video data at a first frame rate and a first resolution and second video data at a second frame rate and a second resolution. The second frame rate is higher than the first frame rate and the second resolution is lower than the first resolution. Further, the at least one processor is configured to detect an amount of motion in the captured second video data and, on the basis of the detected amount of motion, switch the at least one imaging sensor to a second configuration. Further, the at least one processor is configured to, on the basis of the second configuration, capture third video data at a third frame rate and a third resolution. The third frame rate is higher than the first frame rate, e.g., equal to or higher than the second frame rate, and the third resolution is higher than the second resolution, e.g., equal to the first resolution. For example, the third frame rate may be at least 100 frames per second, whereas the first frame rate may be 20 to 60 frames per second, e.g., 24 frames per second, 25 frames per second, 30 frames per second, 50 frames per second, or 60 frames per second.

According to some embodiments, the at least one imaging sensor comprises an array camera formed of a plurality of sub-cameras. In this case, in the first configuration only a subset of the sub-cameras, e.g., only one of the sub-cameras, is assigned to capturing the second video data while the other sub-cameras are assigned to capturing the first video data. As compared to that, in the second configuration all the sub-cameras are assigned to capturing the third video data.

According to some embodiments, the at least one imaging sensor comprises a first imaging sensor and a second imaging sensor having a lower performance than the first imaging sensor. In this case, in the first configuration the first image sensor is assigned to capturing the first video data while the second image sensor is assigned to capturing the second video data. As compared to that, in the second configuration the first imaging sensor is assigned to capturing the third video data.

According to an embodiment the at least one processor is configured to generate a slow motion video at least on the basis of the third video data. In some embodiments the at least one processor may configured to generate the slow motion video on the basis of the first video data, the second video data, and the third video data. For example, the at least one processor may be configured to calculate, on the basis of the first video data, enhanced resolution video frames from the second video data. In addition or as an alternative, the at least one processor may be configured to calculate, on the basis of the second video data, intermediate video frames for the first video data.

According to an embodiment, the at least one processor is configured to detect said amount of motion on the basis of blur in the second video data.

The at least one processor may be configured to perform steps of the method according to the above embodiments.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to dynamic adaptation of video capturing frame rate by switching between different configurations of one or more imaging sensors, e.g., with the aim of generating a slow motion video on the basis of video data captured at higher frame rate. By utilizing different imaging sensor configurations, efficient capturing of high quality video at high frame rates may be enabled. In particular, in a first imaging sensor configuration, while capturing video data at high resolution and at a certain frame rate, further video data may be captured at a lower resolution and a higher frame rate to allow efficient detection of fast motion in the captured scene. If fast motion is detected, switching to a second imaging sensor configuration is triggered, to capture video data at the high resolution and the higher frame rate. By utilizing the high frame rate but lower resolution video data for motion detection, a high responsiveness of switching to the second configuration may be achieved. At the same time, resource utilization, e.g., with respect to energy consumption by the imaging sensor(s) or memory required for storage of the captured video data, may be limited to sustainable values.

Figure 1:
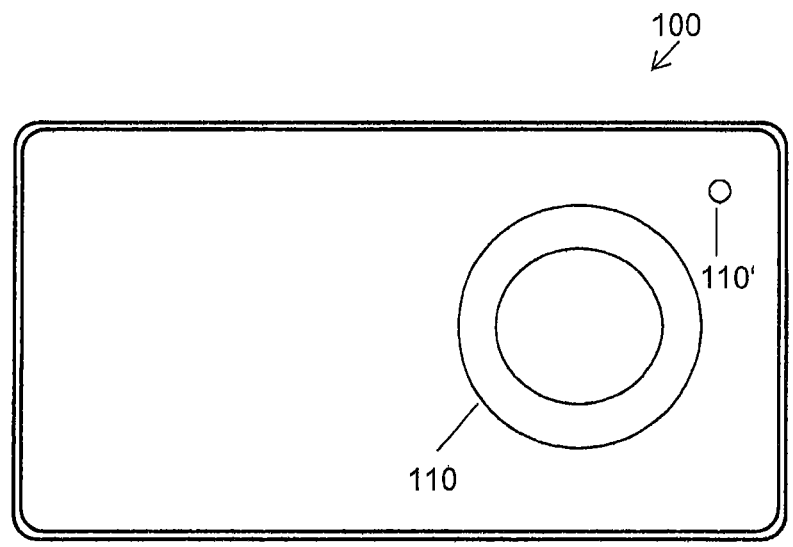
FIG. 1 schematically illustrates a scenario a device according to an embodiment of the invention.

FIG. 1 schematically illustrates a device 100. In the example of FIG. 1, the user device 100 is assumed to be a smartphone or digital camera. As illustrated, the device 100 is equipped with a primary camera 110 and a secondary camera 110'. The primary camera 110 is assumed to be a high-performance camera which allows for capturing digital video at high resolution, e.g., at "Full HD" resolution of 1920×1080 pixels or even higher resolution, such as "Ultra HD" resolution of 3840×2160 pixels or even 7680×4320 pixels. Further the primary camera 110 is assumed to support various frame rates of video capturing, e.g., 24, 30, 50, 60 frames per second, as typically utilized for normal speed video capturing. In addition, the primary camera 110 is assumed to support one or more higher frame rates for capturing slow motion videos. Such higher frame rate may be 100 frames per second or more, e.g., 120 frames per second, 200 frames per second or 500 frames per second. In addition to capturing video, the primary camera 110 may also support capturing of still images at various resolutions.

The secondary camera 110' is assumed to be a camera of lower performance than the primary camera 110. For example, the secondary camera 110' may support capturing digital video only at lower resolution than the primary camera 110, e.g., at a resolution of 960×540 pixels or 640×360 pixels. The secondary camera 110' may also utilize a smaller image sensor format than the primary camera 110, e.g., about 25 $mm^2$ for the secondary camera 110' as compared to 500 $mm^2$ for the primary camera 110. At the same time, the secondary camera 110' is assumed to support the same frame rates of video capturing.

For efficiently adapting the video capturing frame rate, the device 100 may be operated as follows: First capturing of video data may be initiated in a conventional manner, e.g., by the user selecting a video capturing mode of the device 100 and activating capturing of video data, e.g., by pressing a camera button of the device 100 or selecting a corresponding element of a graphical user interface of the device 100. The device 100 then captures video data using both the primary camera 110 and the secondary camera 110'. The primary camera 110 is utilized for capturing first video data at a high resolution and a normal frame rate, e.g., at Full HD or 4 K resolution and 25 frames per second. At the same time, the secondary camera 110' is utilized for capturing second video data at a lower resolution and a higher frame rate than utilized for the first video data. For example, the second video data may be captured at a resolution of 960×540 pixels and a frame rate of 200 frames per second. In this mode, the second video data may be utilized for detection of fast motion in the captured scene. Due to the higher frame rate, a high responsiveness of motion detection may be achieved. At the same time, utilization of the lower performance secondary camera and the lower resolution allows for avoiding excessive resource usage. The second video data may be stored only temporarily, as required for image analysis to perform the detection of fast motion. In this way, memory requirements for storage of the captured video data may be relaxed. However, in some scenarios the second video data may be stored in a similar manner as the first image data, e.g., so as to be utilized for rendering a slow motion video. The detection of fast motion may for example involve identifying blur in the second video data. However, other ways of detecting fast motion may be utilized as well, e.g., motion detection on the basis of motion vectors determined by image analysis of a sequence of video frames.

If fast motion is detected, the device 100 switches to a different configuration of utilizing the primary camera 110 and the secondary camera 110'. In this configuration, the primary camera 110 is utilized for capturing third video data at a high resolution and a higher frame rate than utilized for capturing the first video data. For example, the third video data may be captured at the same high resolution as utilized for capturing the first video data and the same higher frame rate as utilized for capturing the second video data. Accordingly, the primary camera is utilized in a high performance mode.

The high resolution and high frame rate as utilized for capturing the third video data allows for utilizing the third video data as a basis for generating a high quality slow motion video. Such slow motion video may start at the point when the fast motion was detected, so that also unexpected fast motion in the captured scene may be covered. In some cases, also the second video data may be utilized for generating a slow motion video covering also a time interval before detecting the fast motion. For example, the second video data may be utilized for computing intermediate video frames to increase the frame rate of the first video data. In such intermediate frames, the first video data may in turn be utilized for extrapolating the video frames of the second video data to a higher resolution.

At some point, the device 100 may stop utilizing the primary camera 110 in the high performance mode. For example, when detecting that fast motion is no longer present in the captured scene, e.g., by analyzing the third video data, the device 100 may switch back to the initial configuration in which the primary camera 110 is utilized for capturing first video data at the high resolution and the normal frame rate while the secondary camera 110' is utilized for capturing second video data at the lower resolution and higher frame rate. Further, the user may manually switch back to the initial configuration or stop the capturing of video data.

It is to be understood that the high performance primary camera 110 and the lower performance secondary camera 110' as mentioned above are merely examples of imaging sensors which may be utilized for implementing the illustrated switching of configurations for adaptation of video capturing frame rate. Another example of an imaging sensor which may be utilized is an array camera, i.e., a camera provided with an array of sub-cameras, each delivering an individual image of the captured scene. An example of an array camera 112 is schematically illustrated in FIG. 2.

Figure 2:
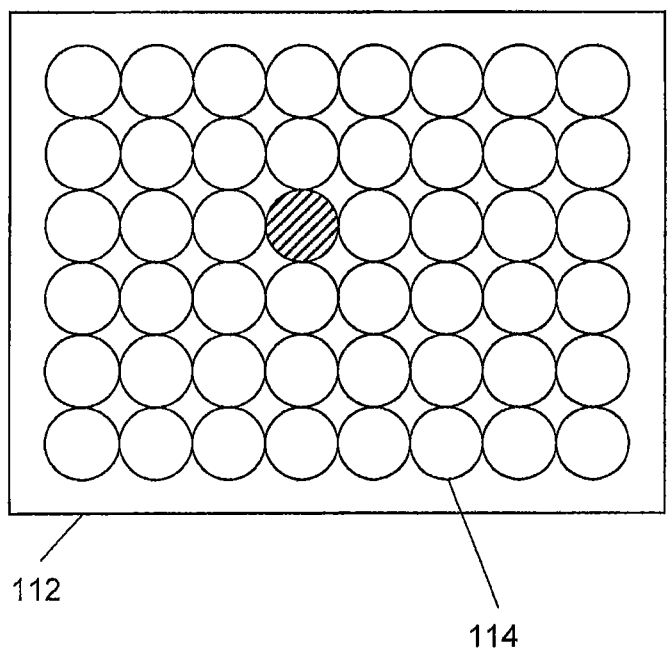
FIG. 2 schematically illustrates an imaging sensor which may be utilized according to an embodiment of the invention.

As illustrated in FIG. 2, the array camera 112 is based on an array of multiple sub-cameras 114. Each of these sub-cameras 114 may support capturing of video data at a certain pixel resolution, e.g., 200×200 pixels. Further, each of the sub-cameras 114 may be provided with individual camera optics, e.g., on the basis of microlenses. When utilizing the array camera 112 instead of the primary camera 110 and the secondary camera 110' of FIG. 1, in the initial configuration a part of the sub-cameras 114, e.g., one sub-camera as indicated by the shading in FIG. 2, may be utilized for capturing the second video data while the other sub-cameras 114 are utilized for capturing the first video data. When fast motion is detected, a different configuration of the array camera 112 may be utilized, in which all the sub-cameras 114 are utilized for capturing the third video data.

It is to be understood, that it would also be possible to utilize multiple sub-cameras 114, e.g., four sub-cameras, for capturing the second video data or that the array camera 112 could be utilized in combination with an additional low-performance camera, such as the secondary camera 110' of FIG. 1.

Figure 3:
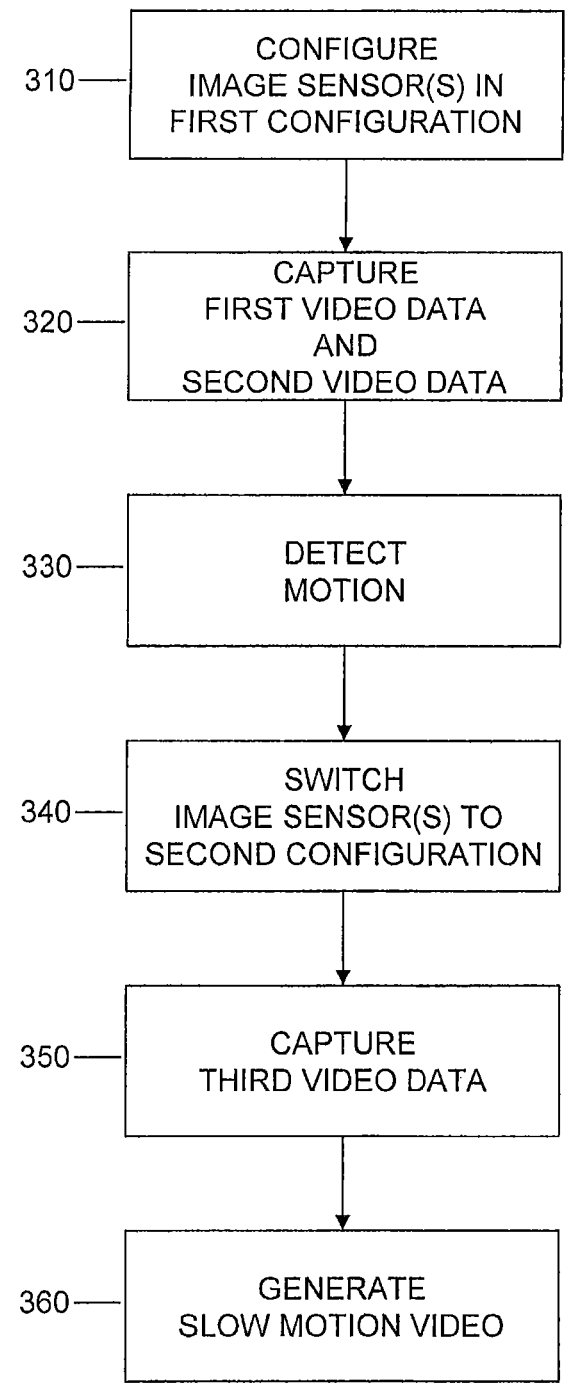
FIG. 3 shows a flowchart for illustrating a method according to an embodiment of the invention.

FIG. 3 shows a flowchart which illustrates a method of capturing video. The method may for example be implemented in a device equipped with one or more imaging sensors, such as the above-mentioned device 100. The at least one imaging sensor may for example include a first camera and a second camera having lower performance than the first camera, such as explained for the primary camera 110 and the secondary camera 110' of FIG. 1. The at least one imaging sensor may also include an array camera formed of a plurality of sub-cameras, such as explained in connection with FIG. 2. If a processor based implementation of the device is utilized, at least a part of the steps of the method may be performed and/or controlled by one or more processors of the device.

At step 310, the at least one imaging sensor of the device is configured in a first configuration.

At step 320, first video data and second video data are captured on the basis of the first configuration of the at least one imaging sensor. The first vide data is captured at a first frame rate and a first resolution. The second video data is captured at a second frame rate and a second resolution.

The second frame rate is higher than the first frame rate and the second resolution is lower than the first resolution.

If the at least one imaging sensor includes a first image sensor and a second imaging sensor having a lower performance than the first imaging sensor, such as the primary camera 110 and the secondary camera 110' of FIG. 1, in the first configuration the first image sensor may be assigned to capturing the first video data while the second image sensor is assigned to capturing the second video data.

If the at least one imaging sensor includes an array camera, such as explained in connection with FIG. 2, in the first configuration only a subset of the sub-cameras may be assigned to capturing the second video data while the other sub-cameras are assigned to capturing the first video data. In some scenarios, the subset of the sub-cameras may correspond to only one of the sub-cameras. In other scenarios, the subset may include more of the sub-cameras.

At step 330, an amount of motion is detected in the captured second video data. This may for example involve detecting blur in the second video data. Further, this may involve determining one or more motion vectors by performing image analysis on a sequence of video frames of the second video data.

At step 340, the at least one imaging sensor is switched to a second configuration. This is accomplished on the basis of the amount of motion detected at step 330. For example, if the amount of motion is represented by a numerical value, switching to the second configuration may be triggered by the amount of motion exceeding a threshold.

At step 350, third video data is captured on the basis of the second configuration. The third video data is captured at a third frame rate and a third resolution. The third frame rate is higher than the first frame rate and the third resolution is higher than the second resolution. The third resolution may be equal to the first resolution. However, also other resolutions higher than the second resolution may be utilized. The third frame rate may be equal to the second frame rate. However, in some cases the third frame rate may be even higher than the second frame rate. To allow generation of a high quality slow motion video on the basis of the third video data, the third frame rate may be at least 100 frames per However, depending on the desired characteristics of the slow motion video, also higher frame rates may be utilized, e.g., 200 frames per second, 500 frames per second, 1000 frames per second, or even more.

If the at least one imaging sensor includes an array camera, such as explained in connection with FIG. 2, in the second configuration all the sub-cameras of the array camera may be assigned to capturing the third video data.

If the at least one imaging sensor includes a first image sensor and a second imaging sensor having a lower performance than the first imaging sensor, such as the primary camera 110 and the secondary camera 110' of FIG. 1, in the second configuration the first image sensor may be assigned to capturing the third video data.

At step 360, a slow motion video may be generated on the basis of the third video data. This may involve configuring playback of the third video data at a lower frame rate than the third frame rate. In some scenarios, also the first video data and/or the second video data may be used as a basis for generating the slow motion video. For example, on the basis of the first video data, enhanced resolution video frames may be calculated from the second video data. Such video frames may in turn be inserted as intermediate video frames between video frames of the first video data to enhance the frame rate of the first video data. In other words, the second video data, may be utilized as a basis for calculating intermediate video frames for the first video data.

Figure 4:
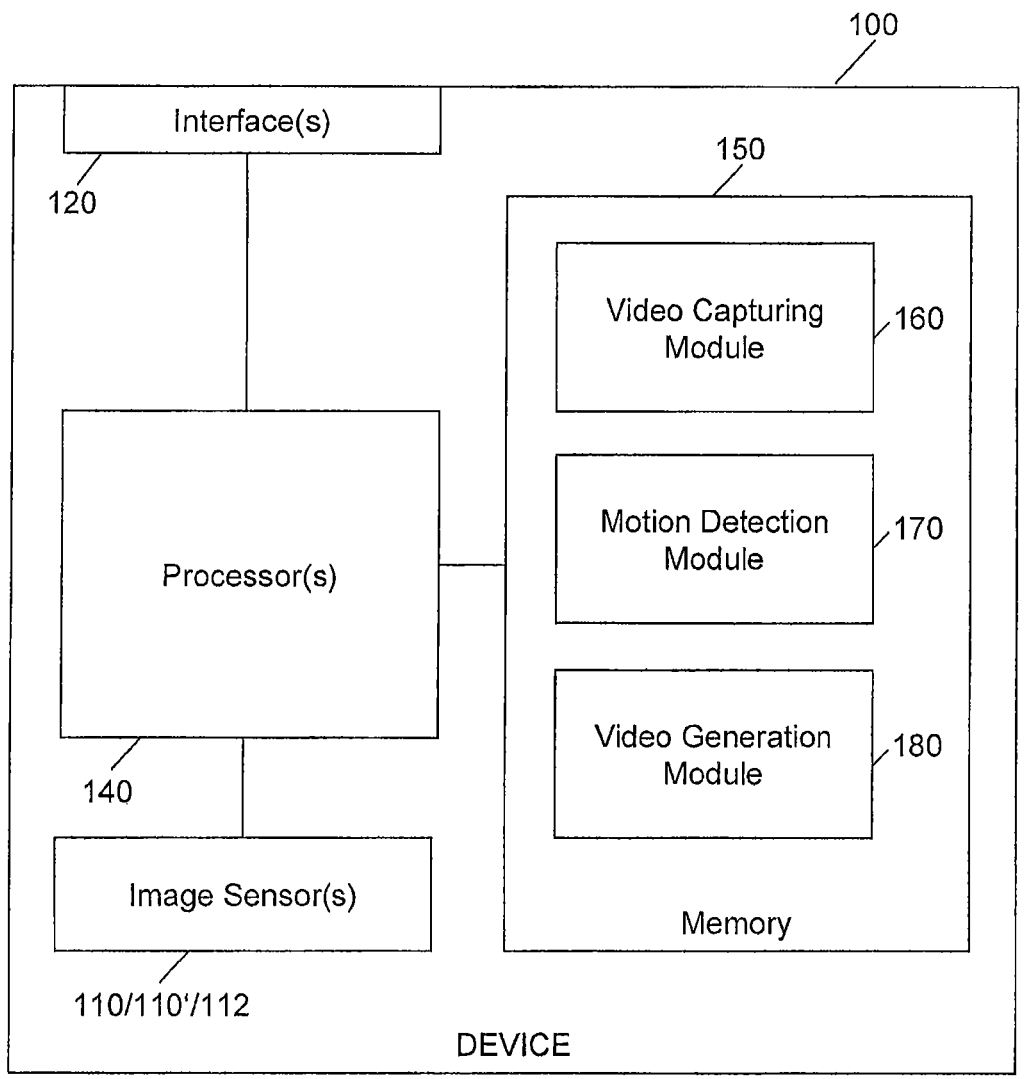
FIG. 4 schematically illustrates a device according to an embodiment of the invention.

FIG. 4 shows a block diagram for schematically illustrating a processor based implementation of a device which may be utilized for implementing the above-described concepts. For example, the structures as illustrated by FIG. 4 may be utilized to implement the device 100.

As illustrated, the device 100 includes one or more imaging sensors, such as the primary camera 110 and the secondary camera 110' or the array camera 112. Further, the device may include one or more interfaces 120. For example, if the device 100 corresponds to a smartphone or similar portable communication device, the interface(s) 120 may include one or more radio interfaces and/or one or more wire-based interfaces for providing network connectivity of the device 100. Examples of radio technologies for implementing such radio interface(s) for example include cellular radio technologies, such as GSM (Global System for Mobile Communications), UMTS (Universal Mobile Telecommunication System), LTE (Long Term Evolution), or CDMA2000, a WLAN (Wireless Local Area Network) technology according to an IEEE 802.11 standard, or a WPAN (Wireless Personal Area Network) technology, such as Bluetooth. Examples of wire-based network technologies for implementing such wire-based interface(s) for example include Ethernet technologies and USB (Universal Serial Bus) technologies.

Further, the device 100 is provided with one or more processors 140, and a memory 150. The imaging sensor(s) 110/110'/112, the interface(s) 120, and the memory 150 are coupled to the processor(s) 140, e.g., using one or more internal bus systems of the user device 100.

The memory 150 includes program code modules 160, 170, 180 with program code to be executed by the processor(s) 140. In the illustrated example, these program code modules include a video capturing module 160, a motion detection module 170, and a video generation module 180.

The video capturing module 160 may implement the above-described functionalities of capturing video data on the basis of different imaging sensor configurations and may only control switching between such imaging sensor configurations, e.g., as explained in connection with steps 310, 320, 340, and 350 of FIG. 3.

The motion detection module 170 may implement the above-described functionalities of detecting motion in the captured scene, e.g., on the basis of blur in the second video data and/or on the basis of motion vectors determined by image analysis of a sequence of video frames of the second video data, such as explained in connection with steps 340 of FIG. 3.

The video generation module 180 may implement the above-described functionalities of generating a slow motion video on the basis of the captured video data, e.g., as explained in connection with step 360 of FIG. 3.

It is to be understood that the structures as illustrated in FIG. 4 are merely exemplary and that the device 100 may also include other elements which have not been illustrated, e.g., structures or program code modules for implementing known functionalities of a smartphone, digital camera, or similar device. Examples of such functionalities include communication functionalities, media handling functionalities, or the like.

As can be seen, the concepts as explained above allow for efficiently capturing video data. Specifically, by the dynamic adaptation of the video capturing frame rate and switching between imaging sensor configurations, it becomes possible to capture video data which allows for generating high quality slow motion videos while at the same time keeping resource utilization in a sustainable region.

It is to be understood that the concepts as explained above are susceptible to various modifications. For example, the concepts could be applied in various kinds of devices, in connection with various kinds of imaging sensor technologies. Further, the concepts may be applied with respect to various kinds of video resolutions and frame rates.

The invention claimed is:

1. A method of capturing video, the method comprising:
configuring at least one imaging sensor in a first configuration;
on the basis of the first configuration, capturing first video data at a first frame rate and a first resolution and second video data at a second frame rate and a second resolution, the second frame rate being higher than the first frame rate and the second resolution being lower than the first resolution, wherein the first video data is captured at a same time that the second video data is captured;
detecting an amount of motion in the captured second video data;
on the basis of the detected amount of motion, switching the at least one imaging sensor to a second configuration; and
on the basis of the second configuration, capturing third video data at a third frame rate and a third resolution, the third frame rate being higher than the first frame rate and the third resolution being higher than the second resolution,
wherein the at least one imaging sensor comprises an array camera comprising a plurality of sub-cameras;
wherein in the first configuration only a subset of the sub-cameras is assigned to capturing the second video data while the other sub-cameras are assigned to capturing the first video data; and
wherein in the second configuration all the sub-cameras are assigned to capturing the third video data.

2. The method according to claim 1,
wherein the third resolution is equal to the first resolution.

3. The method according to claim 1,
wherein the third frame rate is equal to or higher than the second frame rate.

4. The method according to claim 1,
wherein the third frame rate is at least 100 frames per second.

5. The method according to claim 1,
wherein the subset of the sub-cameras consists of one of the sub-cameras.

6. The method according to claim 1, comprising:
generating a slow motion video at least on the basis of the third video data.

7. The method according to claim 1,
wherein said amount of motion is detected on the basis of blur in the second video data.

8. A method of capturing video, the method comprising:
configuring at least one imaging sensor in a first configuration;
on the basis of the first configuration, capturing first video data at a first frame rate and a first resolution and second video data at a second frame rate and a second resolution, the second frame rate being higher than the first frame rate and the second resolution being lower than the first resolution, wherein the first video data is captured at a same time that the second video data is captured;
detecting an amount of motion in the captured second video data;
on the basis of the detected amount of motion, switching the at least one imaging sensor to a second configuration; and
on the basis of the second configuration, capturing third video data at a third frame rate and a third resolution, the third frame rate being higher than the first frame rate and the third resolution being higher than the second resolution,
wherein the at least one imaging sensor comprises first image sensor and a second imaging sensor having a lower performance than the first imaging sensor;
wherein in the first configuration the first image sensor is assigned to capturing the first video data while the second image sensor is assigned to capturing the second video data; and
wherein in the second configuration the first image sensor is assigned to capturing the third video data.

9. A method of capturing video, the method comprising:
configuring at least one imaging sensor in a first configuration;
on the basis of the first configuration, capturing first video data at a first frame rate and a first resolution and second video data at a second frame rate and a second resolution, the second frame rate being higher than the first frame rate and the second resolution being lower than the first resolution, wherein the first video data is captured at a same time that the second video data is captured;
detecting an amount of motion in the captured second video data;
on the basis of the detected amount of motion, switching the at least one imaging sensor to a second configuration;
on the basis of the second configuration, capturing third video data at a third frame rate and a third resolution, the third frame rate being higher than the first frame rate and the third resolution being higher than the second resolution; and
generating the slow motion video on the basis of the first video data, the second video data, and the third video data.

10. The method according to claim 9, comprising:
on the basis of the first video data, calculating enhanced resolution video frames from the second video data.

11. The method according to claim 9, comprising:
on the basis of the second video data, calculating intermediate video frames for the first video data.

12. A device, comprising:
at least one image sensor; and
at least one processor, the at least one processor being configured to perform operations comprising:
configuring the at least one imaging sensor in a first configuration;
on the basis of the first configuration, capturing first video data at a first frame rate and a first resolution and second video data at a second frame rate and a second resolution, the second frame rate being higher than the first frame rate and the second resolution being lower than the first resolution, wherein the first video data is captured at a same time that the second video data is captured;
detecting an amount of motion in the captured second video data;
on the basis of the detected amount of motion, switching the at least one imaging sensor to a second configuration; and
on the basis of the second configuration, capturing third video data at a third frame rate and a third resolution, the third frame rate being higher than the first frame rate and the third resolution being higher than the second resolution,
wherein the at least one imaging sensor comprises an array camera comprising a plurality of sub-cameras,
wherein in the first configuration only a subset of the sub-cameras is assigned to capturing the second video data while the other sub-cameras are assigned to capturing the first video data, and
wherein in the second configuration all the sub-cameras are assigned to capturing the third video data.

13. The device according to claim 12, wherein the third resolution is equal to the first resolution.

14. The device according to claim 12, wherein the third frame rate is equal to or higher than the second frame rate.

15. The device according to claim 12, wherein the third frame rate is at least 100 frames per second.

16. The device according to claim 12, wherein the subset of the sub-cameras consists of one of the sub-cameras.

17. The device according to claim 12, wherein the at least one processor is configured to generate a slow motion video at least on the basis of the third video data.

18. A device, comprising:
at least one image sensor; and
at least one processor, the at least one processor being configured to perform operations comprising:
configuring the at least one imaging sensor in a first configuration;
on the basis of the first configuration, capturing first video data at a first frame rate and a first resolution and second video data at a second frame rate and a second resolution, the second frame rate being higher than the first frame rate and the second resolution being lower than the first resolution, wherein the first video data is captured at a same time that the second video data is captured;
detecting an amount of motion in the captured second video data;
on the basis of the detected amount of motion, switching the at least one imaging sensor to a second configuration; and
on the basis of the second configuration, capturing third video data at a third frame rate and a third resolution, the third frame rate being higher than the first frame rate and the third resolution being higher than the second resolution,
wherein the at least one processor is configured to generate the slow motion video on the basis of the first video data, the second video data, and the third video data.

19. The device according to claim 18, wherein the at least one processor is configured to calculate, on the basis of the first video data, enhanced resolution video frames from the second video data.

20. The device according to claim 18, comprising:
wherein the at least one processor is configured to calculate, on the basis of the second video data, intermediate video frames for the first video data.

21. The device according to claim 12,
wherein the at least one processor is configured to detect said amount of motion on the basis of blur in the second video data.

22. A device, comprising:
at least one image sensor; and
at least one processor, the at least one processor being configured to perform operations comprising:
configuring the at least one imaging sensor in a first configuration;
on the basis of the first configuration, capturing first video data at a first frame rate and a first resolution and second video data at a second frame rate and a second resolution, the second frame rate being higher than the first frame rate and the second resolution being lower than the first resolution, wherein the first video data is captured at a same time that the second video data is captured;
detecting an amount of motion in the captured second video data;
on the basis of the detected amount of motion, switching the at least one imaging sensor to a second configuration; and
on the basis of the second configuration, capturing third video data at a third frame rate and a third resolution, the third frame rate being higher than the first frame rate and the third resolution being higher than the second resolution,
wherein the at least one imaging sensor comprises first imaging sensor and a second imaging sensor having a lower performance than the first imaging sensor;
wherein in the first configuration the first imaging sensor is assigned to capturing the first video data and the second imaging sensor is assigned to capturing the second video data; and
wherein in the second configuration the first imaging sensor is assigned to capturing the third video data.

* * * * *